US011292169B2

(12) United States Patent
Laput et al.

(10) Patent No.: US 11,292,169 B2
(45) Date of Patent: Apr. 5, 2022

(54) METHOD OF FABRICATING SOFT FIBERS USING FUSED DEPOSITION MODELING (71) Applicant: CARNEGIE MELLON UNIVERSITY, Pittsburgh, PA (US)

(72) Inventors: Gierad Laput, Pittsburgh, PA (US); Christopher Harrison, Pittsburgh, PA (US); Xiang Chen, Mountain View, CA (US)

(73) Assignee: CARNEGIE MELLON UNIVERSITY, Pittsburgh, PA (US)

(*) Notice: Subject to any disclaimer, the term of this patent is extended or adjusted under 35 U.S.C. 154(b) by 341 days.

(21) Appl. No.: 15/772,193

(22) PCT Filed: Oct. 31, 2016

(86) PCT No.: PCT/US2016/059788
§ 371 (c)(1),
(2) Date: Apr. 30, 2018

(87) PCT Pub. No.: WO2017/075616
PCT Pub. Date: May 4, 2017

(65) Prior Publication Data
US 2018/0281275 A1 Oct. 4, 2018

Related U.S. Application Data (60) Provisional application No. 62/285,469, filed on Oct. 29, 2015.

(51) Int. Cl.
B33Y 80/00 (2015.01)
B33Y 10/00 (2015.01)
(Continued)

(52) U.S. Cl.
CPC .............. *B29C 48/02* (2019.02); *B29C 48/05* (2019.02); *B29C 48/266* (2019.02);
(Continued)

(58) Field of Classification Search
CPC ... B29C 64/118; B29C 64/106; B29C 48/266; B29C 48/05; B29C 48/20; B29C 70/52;
(Continued)

(56) References Cited

U.S. PATENT DOCUMENTS 5,936,861 A 8/1999 Jang et al.
2014/0291886 A1* 10/2014 Mark .................... B29C 70/384
264/259
(Continued)

FOREIGN PATENT DOCUMENTS

WO 2015077262 A1 5/2015
WO WO-2015077262 A1 * 5/2015 ............. B33Y 30/00

OTHER PUBLICATIONS

Guillemette Richard; "Coextruded, Multilayered and Multicomponent 3D Printing Inputs"; (2015) (Year: 2015).*
(Continued)

*Primary Examiner* — Francisco W Tschen
*Assistant Examiner* — Edgaredmanuel Troche
(74) *Attorney, Agent, or Firm* — Michael G. Monyok (57) ABSTRACT Embodiments disclosed herein describe a method of fabricating soft, flexible fibers using a 3D printer having an extrusion head. Embodiments of the method further include termination techniques to allow a series of fibers to be fabricated on the same object. Aspects of the certain embodiments offer a range of design parameters for controlling the properties of single strands and also of bundles of fibers. The method extends the capabilities of 3D printing without requiring any new hardware.

13 Claims, 5 Drawing Sheets (51) Int. Cl.
  *B29C 48/05* (2019.01)
  *B29C 64/118* (2017.01)
  *B33Y 70/00* (2020.01)
  *B29C 48/02* (2019.01)
  *B29C 48/25* (2019.01)
  *B29K 101/12* (2006.01)

(52) U.S. Cl.
  CPC ............ *B29C 64/118* (2017.08); *B33Y 10/00* (2014.12); *B33Y 80/00* (2014.12); *B29K 2101/12* (2013.01); *B33Y 70/00* (2014.12)

(58) Field of Classification Search
  CPC ..... B29C 64/10; B29C 64/171; B29C 64/188; B29C 64/30; B33Y 10/00; B29K 2105/12; B29K 2105/122
  USPC .................................. 264/308, 164, 165, 168
  See application file for complete search history.

(56) References Cited

U.S. PATENT DOCUMENTS

2014/0319045 A1 10/2014 Shevitz
2016/0325505 A1* 11/2016 Ou ........................ B29C 64/393
2017/0129171 A1* 5/2017 Gardner ................ B33Y 50/02

OTHER PUBLICATIONS

A. "Incredible 3D Printed Paintbrush, Broom, & More Created with Fiber Bridging Technique"; (NPL) (Dec. 22, 2014; by Brittney Sevenson). (Year: 2014).*
Leonard, M. (Dec. 16, 2014. Spyder Byte—Bridging Techniques—Spyder3D World. Retrieved from https://www.spyder3dworld.com/spyder-byte-bridging-techniques (Year: 2014).*
International Search Report and Written Opinion of the International Searching Authority for PCT Application PCT/US2016/059788 dated Dec. 29, 2016.

* cited by examiner

METHOD OF FABRICATING SOFT FIBERS USING FUSED DEPOSITION MODELING

CROSS-REFERENCE TO RELATED APPLICATIONS

This application claims the benefit under 35 U.S.C. § 119 of Provisional Application Ser. No. 62/285,469, filed Oct. 29, 2015, which is incorporated herein by reference.

STATEMENT REGARDING FEDERALLY SPONSORED RESEARCH

This invention was made with government support under the NSF Number IIS1217929. The government has certain rights in this invention.

BACKGROUND OF THE INVENTION

The invention relates generally to a method for fabricating soft fibers using additive manufacturing techniques. More specifically, the invention relates to a method of creating soft and flexible fibers, strands, and bristles using additive manufacturing techniques such as fused deposition modeling (FDM).

Advances in additive manufacturing techniques, e.g., 3D printing, have made it possible for people to accurately and relatively cheaply fabricate objects with unprecedented levels of customization. Recent and continued developments in 3D printing have dramatically reduced deployment costs, making it more accessible to novices, hobbyists, and people outside professional communities. Conventional additive manufacturing techniques are designed to print models with precise form and rigid material properties, which limits the scope of objects that can be modeled.

For example, printing fibers, strands, or bristles without the use of a support structure remains difficult with current 3D printers. Various techniques have been developed to overcome this shortcoming. In one technique known as fiber bridging, a 3D printer is used to extrude "bridges" of material across two support structures. In a post-processing step, one of the support structures can be removed to create fibers having a base at the one remaining support structure. Notably, the bridges are created by slowly moving the extrusion head of the printer from one support to the next. With slow movement, the material solidifies during the process and tends to support itself. To provide adequate support, the fibers are generally thicker and stiffer than other high aspect ratio fibers. As such, the fibers created by this method are somewhat inflexible and are more bristle-like than hair-like).

Outside of 3D printing, traditional manufacturing techniques often utilize pre-formed fibers. For example, a paint brush can be made by inserting strands of synthetic fibers into injection-molded plastic handles, where they fuse with molten material in the mold cavity. Similarly, bundles of fibers can be mechanically sutured into brush blocks. In general, fiber insertion is usually a finishing step in the manufacturing process and requires special-purpose machines and tools.

In the techniques mentioned above, relatively rigid fibers are created using additive manufacturing systems, or pre-formed soft fibers are added to an object using traditional manufacturing techniques. Single step manufacturing of objects containing soft fibers is not currently practiced. It would therefore be advantageous to develop a method of fabricating soft fibers using conventional additive manufacturing systems.

BRIEF SUMMARY

According to embodiments of the present invention are methods of additive manufacturing (e.g. 3D printing) used to create soft fibers, strands, and bristles by exploiting the physical characteristics of material stringing inherent in fused deposition modeling-based printers. In one embodiment, fibers are created by rapidly moving an extrusion head of a 3D printer away from an object, where the extrusion material adheres to both the object and the extrusion head. Stated differently, a fiber is drawn as the extrusion head is moved away from the object. Various fiber termination techniques are provided in alternative embodiments to allow for fabrication of a series of fibers. Further, embodiments of the method present design parameters for controlling properties of single fibers and/or bundles of fibers and are easily integrated into current additive manufacturing systems. For example, the method can be implemented using commercially available and low-cost 3D printers. Further, the method can be used to expand the utility of 3D printing applications by introducing fiber components and other stranded elements as design material for 3D printed models.

DETAILED DESCRIPTION

Described herein is a method for printing fibers 100 using an additive manufacturing system 200 that utilizes an extrusion head 201, such as a fused deposition modeling (FDM) printer 200. In one example embodiment, a desktop FDM printer 200 assembled from the Printrbot's Simple Maker's Kit can be used. In this example embodiment, Repetier Host software (available at repetier.com) can be used to simulate the printing process and is beneficial for iterating design parameters.

With 3D printers 200 such as FDM printers 200, a solid thermoplastic material 202 is heated until melted. Once melted, the print head or extrusion head 201 precisely deposits the material 202 at various locations in a first layer. Upon deposition, the material 202 cools and solidifies. The deposition process repeats for a second layer, which is deposited on the now-solidified first layer. The object 300 is ultimately created by adding several additional layers. Depending on its size, the object 300 could comprise hundreds or thousands of layers. Materials 202 used with the method of the present invention can include various thermoplastic materials such as polylactic acid, acrylonitrile butadiene styrene (ABS), polycarbonate, nylon, and thermoplastics blended with additional materials such as carbon, metals, and ceramics. A person having skill in the art will appreciate that any material 202 capable of being used with FDM printers can be used in the method of the present invention.

Figure 5A:
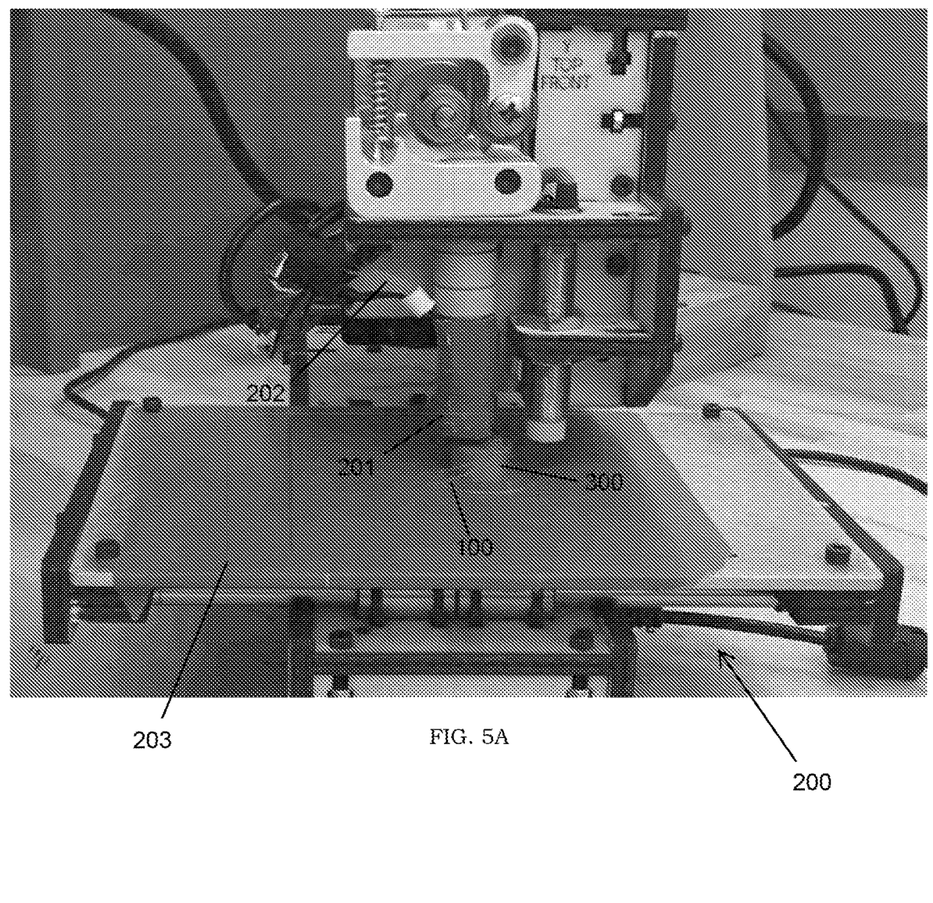
FIGS. 5A-5B shows an FDM printer creating fibers according to the method of one embodiment.
Figure 5B:
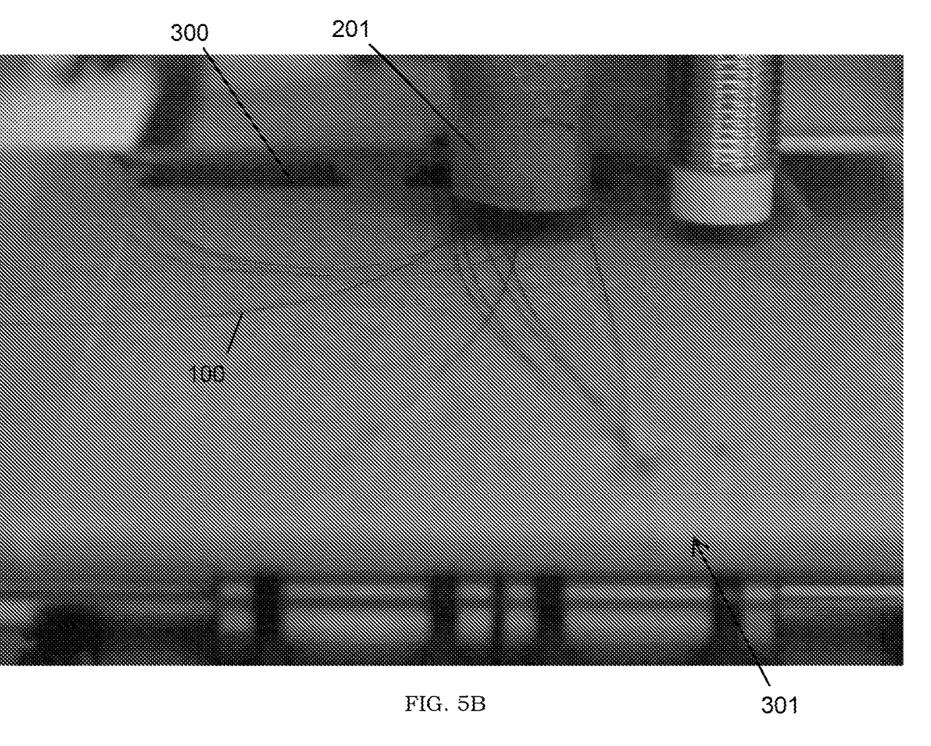

Referring to the figures, FIGS. 5A-5B depict an extrusion head 201 depositing material 202 on objects 300. To begin forming a fiber 100 on the object 300, a small amount of the deposition material 202 is extruded from the extrusion head 201 onto the object 300. Before the material 202 solidifies, the extruder 201 is quickly moved away from the object 300, forming a fiber 100 as the extrusion head 201 moves from the object 300. More specifically, the liquid material 202 deposited on the object 300 is stretched and drawn into a thin strand while it is still in the liquid form. Tension is maintained on the portion of the material 202 between the object 300 and the extrusion head 201 until it cools and solidifies, thus forming a fiber 100. As will be discussed in greater detail, the speed at which the extrusion head 201 is moved away from the object 300 affects, in part, the characteristics of the fiber 100 formed. Further, other factors affecting characteristics of the fiber 100 (such as length, diameter, and rigidity) can include the type of material 202, extruder temperature, speed of the head 201, and amount of material 202 deposited.

In one example embodiment where the 3D printer 200 uses g-code programming software, the method parameters can be specified as follows. In this example, the following snippet of code programs the printer 200 to extrude 5 units of material at a feed rate of 2000 (i.e., 5 mm at 33 mm/s), and then shifts the extruder away to y=60:

```
G1 X30 Y30       ; move to extrusion point
G1 E5 F2000      ; extrude
G1 Y60           ; draw fiber
```

This process can be programmatically repeated to generate multiple threads of fiber 100. As previously mentioned, there are several controllable parameters for this process.

A first parameter comprises the extrusion amount and feed rate of the material 202. In one embodiment, the amount of material 202 used is sufficient enough to maintain a connection of material 202 between the object 300 and the extrusion head 201 as the fiber 100 is drawn, but not exceeding an amount where the head 201 could become clogged. Stated differently, if the printer 200 is extruding too little material 202, the fiber 100 tends to break before reaching its desired length. Conversely, when extruding too much material 202 the residual material 202 not forming part of the fiber 100 will clog the opening of the extrusion head 201. A clog can affect the appearance of the fiber 100 or surrounding structures or even causing occlusion problems.

Within an acceptable range of feed rates, less material 202 extruded leads to thinner fibers 100. Conversely, more material 202 extruded leads to thicker fibers 100. However, fiber 100 thickness can also be affected by other parameters. In the example embodiment described above, the extrusion feed rate should be relatively slow compared to typical printing feed rates since the fiber 100 formed has a small mass due to its small diameter. In another example embodiment, an extrusion feed rate of 500 units/minute for a drawing distance of 50 units is used (50 mm at 8.3 mm/s).

A second parameter comprises drawing speed. The speed of the extruder 201 is controlled to fall within a specific range and depends on other parameters such as desired fiber 100 thickness and length. Moreover, the speed range depends partly on the amount of material 202 feed to the extrusion head 201. As an example of the speed range required, when drawing too slowly, the material 202 tends to droop and harden, failing to form a hair-like fiber 100. Conversely, if it is drawn too quickly, the strand tends to break prematurely. For embodiments utilizing FDM printers 200, drawing speed can be preset or programmatically customized via interpolation (the more interpolated points, the slower the movement, which can cause hair discontinuities).

A third parameter comprises drawing distance. The distance the extrusion head 201 travels from the object 300 limits the length of fibers 100 that can be drawn. The distance also limits the range of the fiber 100 thicknesses that can be achieved. More specifically, as the extruder 201 moves away, the extruded material 202 first deforms into a hard and thick strand. As the drawing continues, there is less and less material 202 left at the extrusion head 201, pulling the fiber 100 increasingly thinner and thus more pliable. That is, the method of the present invention forms a tapered fiber 100 with the largest diameter closest to the object 300.

Once the fiber 100 is formed, the connection between the fiber 100 and the extruder 201 must be severed. When generating a strand of multiple fibers 100, terminating a first fiber 100 allows the extruder 201 to proceed to a subsequent fiber 100. Otherwise, the fiber 100 may loop back to the object 300, leading to entanglement and intractable printing geometries. In one embodiment, the fiber 100 is terminated at a desired length. In alternative embodiments where post-processing steps such as cutting are performed, the fiber 100 can be terminated beyond the desired length.

In one embodiment, termination is achieved by pulling the extruder 201 beyond a fracture point of the fiber. As the extruder 201 moves away from the initial extrusion point at the object 300, the fiber becomes thinner in diameter as its length increases. Eventually, the fiber 100 will become too thin and break. Therefore, in this embodiment, the technique for cutting or terminating the fiber 100 is to move the extruder 201 sufficiently far that fiber 100 naturally terminates. In an alternative embodiment of this technique, the extruder 201 first draws the fiber 100 along a straight line and after reaching a target distance (e.g., Y60), then follows a rectangular path to return to the starting point near the object 300. The programming code for this alternative technique can be written as follows:

```
G1 X50 Y10       ; starting point
G1 E10 F2000     ; extrude
G1 Y60           ; draw
G1 X10           ; 1st turn
G1 Y10           ; 2nd turn
G1 X50           ; back to starting point
```

This technique offers simple implementation. However, the additional travel distance of the extrusion head 201 increases print time. Moreover, 3D printers 200 often have small print beds 203, limiting maximum travel. Consequently, depending on the application and the desired characteristics of the fiber 100, alternative termination methods can be used.

In a first alternative termination method, the material 202 at the end of the extruder 201 is retracted by reversing feed of the material 202 through the extrusion head 201. In a typical FDM printer 200, a solid filament of material 202 is fed to the extrusion head 201 where it is heated and extruded in liquid form. Retraction works well when the fiber 100 is still in contact with not-yet-extruded material in the extruder 201, which can be accomplished be retracting the filament. However, in instances where the fiber has already detached from the material 202 in the extrusion head 201, and is simply sticking to the extrusion head 201 itself (e.g., the cavity wall), retraction will have no effect. Such situations can arise depending on the type of material used, the material temperature, the feed rate, and other fiber 100 and printer 200 parameters.

As such, in a second alternative termination method, the fiber 100 is terminated by scraping the extrusion head 201 against a surface, such as a sacrificial object 301. This method can be used along in combination with the pulling and retracting techniques previously disclosed. In an embodiment using the scraping method, a fiber 100 is detached from the extrusion head 201 by scrubbing excess material 202 from the extrusion head 201 onto the surface. The surface can be part of the printed object, a surface of the printer bed 203, or a sacrificial object 301 such as an auxiliary platform printed near the object 300. If the platform 301 is 3D printed, it can be formed at the same height as the fibers 100, allowing the extruder 201 to pass directly over the platform 301 in single print-and-scrub pass.

When printing a bundle of fibers 100, it is often desirable to maintain close spacing. Sufficient density is particularly desirable when creating fibers 100 for a brush or simulating hair on an object 300. However, spacing that is too close can cause adjacent fibers 100 to coalesce if exposed to the heated extrusion head 201. For example, in one embodiment fibers 100 are printed horizontally in the X-Y plane (i.e. parallel to the print bed 203) in a linear fashion. At a single Z-height, strand density is limited by the radius of the extrusion head 201. Again, because the extrusion head 201 is hot, fibers 100 can detach from the object 300 or become warped if touched by the extruder 201. In the example embodiment utilizing an FDM printer 200 assembled from the Printrbot's Simple Maker's Kit, the lower bound of fiber 100 spacing is 0.2 mm.

To increase density, alternative patterns can be printed. In one embodiment, density is increased and fiber 100 collisions are avoided by taking advantage of the Z-axis. Specifically, fiber extrusion points are staggered for each successive layer, similar to how brick walls are constructed. Because these fibers 100 are so thin after they are drawn out, they harden quickly and do not fuse to other fibers 100 unless contacting the extrusion head 201.

The staggered printing configuration is adjustable via a distribution parameter. That is, the spacing between adjacent fibers 100 on the same layer and the distance between layers can be adjusted. A person having skill in the art will appreciate that several patterns can be utilized to avoid fiber 100 collisions. For example, when hair is being simulated the pattern can be semi-random to avoid an overly artificial appearance, which is often the case with objects containing preformed hair-like fibers formed by other methods or techniques.

By varying any of the aforementioned parameters, a multitude of fibers 100 with different characteristics can be created. Moreover, a bundle of fibers 100 can have uniform properties or each fiber 100 in the bundle can have a specific desired property or characteristic. The characteristics comprise fiber length, fiber thickness, color, bundle density, bundle distribution, fiber pliability, and fiber flow. Each property will be discussed in further detail as follows.

Fiber 100 length is directly coupled to the extruder's 201 travel distance. The maximum length of a fiber 100 is thus set by the size of the print bed 203. In one example embodiment using a printer 200 with a 100×100 mm bed 203, maximum fiber 100 length is approximately 80 mm. Shorter fibers 100 can be created either by adjusting the drawing distance or via post-processing.

Figure 1A:
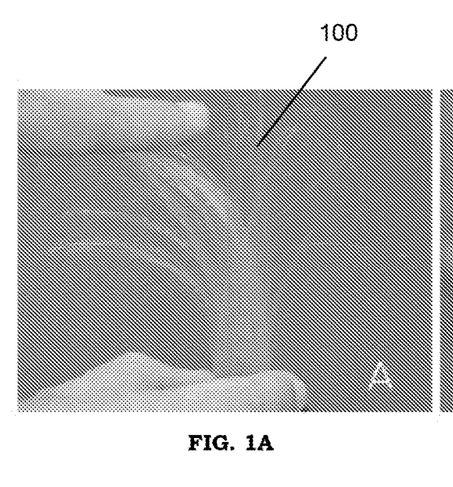
FIGS. 1A-1B show examples of 3D printed fiber, created using a method of one embodiment, including long strands of fine flowing fibers (FIG. 1A) and short and stiff bristles (FIG. 1B).
Figure 1B:
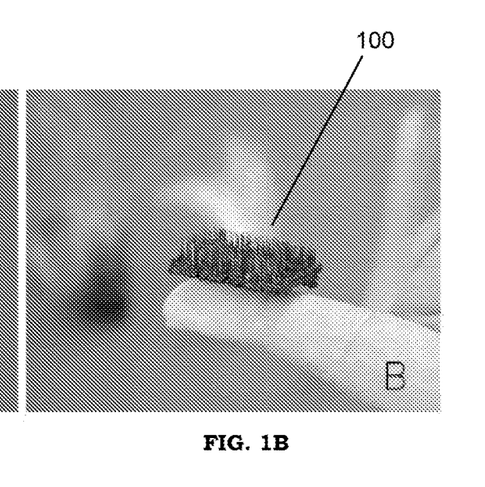

Fiber 100 thickness is controlled by the extrusion amount, feed rate, and drawing speed. Slower feed rates with more extrusion material create thicker fibers 100 (i.e. bristle-like fibers as shown in FIG. 1B). Conversely, faster drawing speeds with less material produce thin, fine strands. For example, the hair-like patch shown in FIG. 1A was printed at a drawing speed of 7800 units (~130 mm/s) while extruding five units of material 202 at a feed rate of 500 units (8.3 mm/s).

Figure 2:
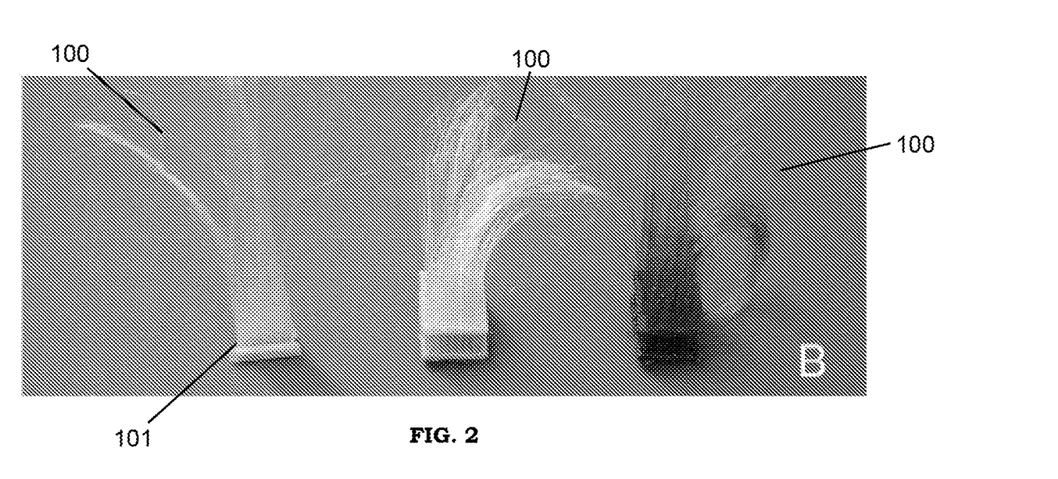
FIG. 2 shows additional examples of 3D printed fibers, created by the method according to one embodiment, with physical and aesthetic properties that resemble natural hair.

Fiber 100 color is trivially controlled by using different source filament colors. FIG. 2 displays similar fibers 100 differing only in color.

Fiber 100 density is controlled by varying the distance between consecutive printed fibers 100. Printing tightly packed fiber 100 strands creates dense patches, while strands printed farther apart will appear sparse. This density can be controlled in X, Y and Z axes for different effects.

The distribution of fiber base positions 101 (i.e. where the fiber 100 is attached to the object 300) can be interleaved, randomized, or uniformed. Adjusting these parameters creates varied fiber 100 layouts. For example, randomizing base positions at each layer creates more natural looking hair-like patches. Conversely, in certain cases, more structured base positions 101 are desirable (e.g., toothbrush bristles).

Finally, fiber 100 flow describes the geometry of how the fiber 100 extends outwards from a surface of the object 300. In one embodiment, fibers 100 are printed extending at a uniform distance and angle (i.e., 180° or 90° relative to the x-y axis). Variations in fiber 100 flow can be achieved by adjusting the travel direction of the extruder 201 as it moves away from the object 300. For example, it is possible to create a "Mohawk" by drawing fibers 100 away orthogonally from a curved surface of an object 300.

Because embodiments of the present invention are capable of producing hair-like fibers 100, several post-processing techniques that mirror human hair practices are applicable and extend the design space of the fibers 100. For example, cutting can be used for reducing length. Cutting can also determine the stiffness of a fiber 100 or bundle of fibers 100. More specifically, fiber 100 diameter tends to get decrease (and thus become softer) as it is drawn further from the object 300. In one example embodiment, cutting the fiber 100 2 mm from the base position 101 produced scrub-brush-like bristles 100, cutting at 10 mm yielded softer toothbrush-like bristles 100, and cutting at 20 mm and above yields soft hair-like fibers 100.

To create short and soft, hair-like fibers 100, extrusion must begin at a location further away from the termination point, so that the correct fiber 100 diameter is reached at the desired base location 101. For some objects 300, this "true base" might start in the interior of the object 300. If this point lies outside the object 300, a sacrificial root platform can be printed and removed in a post-processing step.

As an additional post-processing technique, the thermodynamic properties of the print material 202 means that external heat can soften the printed fiber 100, which enables post-printing manipulations, such as introducing kinks or waves. In one embodiment, the application of heat without tension on the fibers 100 tends to introduce a curl to short lengths of fiber 100. Curls can also be achieved by wrapping fibers 100 (individually or as a bundle) around a solid object and applying heat. FIGS. 4A-4D show example of some post-processing manipulations to the fibers 100.

Figure 3A:
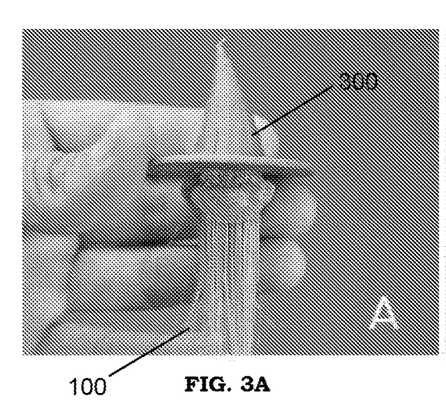
FIGS. 3A-3D present additional examples of 3D printed fibers.
Figure 3B:
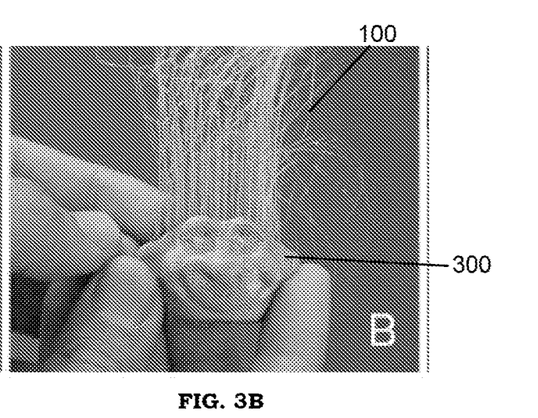
Figure 3C:
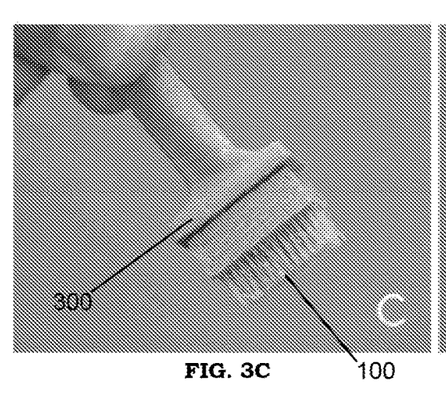
Figure 3D:
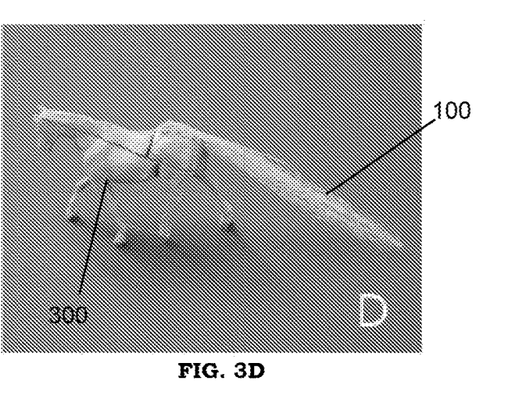

The design space of 3D printed fibers 100 created by embodiments of the present invention is diverse. FIGS. 3A-3D highlight different output examples, each with distinctive design parameters and post-processing effects applied. FIG. 3A shows a 3D printed wizard with a long distinctive beard. To achieve this, a 3D model of a bust was modified by rotating it by 90°, and extruded hair strands 100 from the chin. The strands 100 are dense, straight, and have medium thickness. In FIG. 3B, a troll doll was made by creating long, thin, and straight patches of hair 100 on its head. A randomized hair distribution is used with a premature rectangular return path, which pulled strands to the side near their termination for a "crazy hair" effect. FIG. 3C shows a brush that was created with extra stiff bristles 100 by increasing the extrusion amount and decreasing drawing speed. The drawing process left strands approximately 5 cm long, which were then cut back to 5 mm, leaving only short, straight, and stiff bristles 100. FIG. 3D demonstrates a horse tail that was printed on a horse model broken into smaller parts to allow maximum space for extruding a long and fine-textured tail. The fine-texture of the fibers 100 was achieved by increasing the draw speed and reducing the amount extrusion material 202.

Figure 4A:
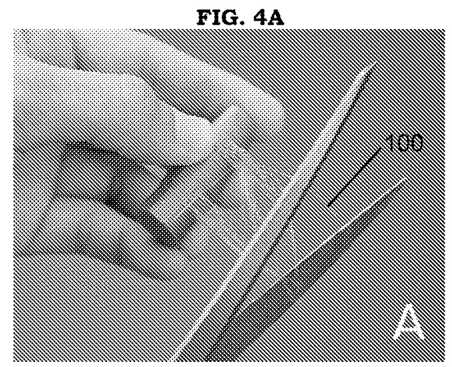
FIGS. 4A-4D illustrates post-fabrication processing techniques for fibers created by the method of one embodiment.
Figure 4B:
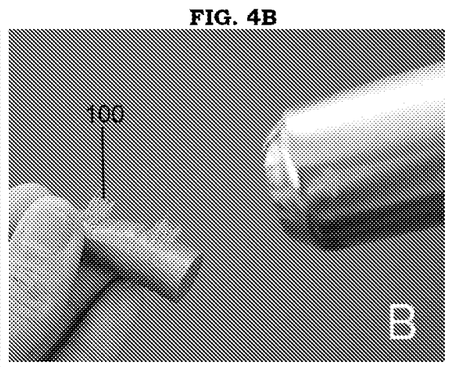
Figure 4C:
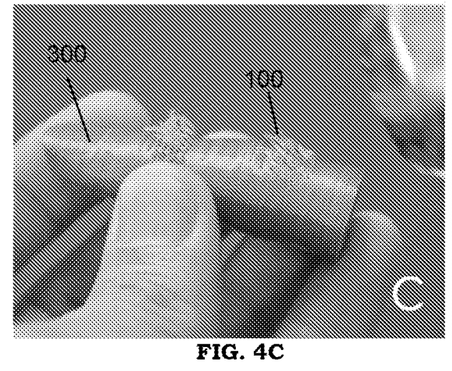
Figure 4D:
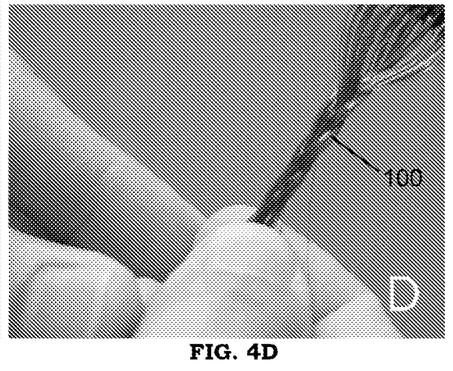

Referring aging to FIGS. 4A-4B, hairs 100 on model finger were printed in a sparse and short configuration. Individual strands 100 were separated by at least 1.2 mm, for a sparser appearance. Once printed, the extruded strands 100 were cut short (FIG. 4A) and curled by blow heating (FIGS. 4B and 4C).

While the disclosure has been described in detail and with reference to specific embodiments thereof, it will be apparent to one skilled in the art that various changes and modification can be made therein without departing from the spirit and scope of the embodiments. Thus, it is intended that the present disclosure cover the modifications and variations of this disclosure provided they come within the scope of the appended claims and their equivalents.

What is claimed is:

1. A method of fabricating fibers on an object using a 3D printer having an extrusion head comprising:
    positioning the extruder head near the object and extruding an amount of material in liquid form from the extrusion head onto the object;
    drawing a thin fiber by moving the extrusion head away from the object,
        wherein a portion of the material remains attached to the extruder head as the extrusion head moves away from the object,
        wherein the fiber thins as the extrusion head moves away from the object;
    maintaining tension on the portion of the material between the object and the extrusion head until it cools into solid form, thereby forming the thin fiber having a first end attached to the object and a second end attached to the extruder head; and
    terminating the thin fiber to create a free end at the second end of the thin fiber by detaching the fiber from the extruder head.

2. The method of claim 1, further comprising:
    adjusting a characteristic of the fiber by specifying a parameter of the 3D printer, the parameter selected from the group consisting of extrusion head speed, material feed rate, and extrusion head distance.

3. The method of claim 2, wherein the characteristic of the fiber comprises:
    thickness, length, or pliability.

4. The method of claim 1, wherein terminating the fiber comprises:
    retracting the material into the extrusion head.

5. The method of claim 1, wherein terminating the fiber comprises:
    moving the extrusion head to a point where the fiber fractures.

6. The method of claim 1, further comprising:
    fabricating additional fibers on the object.

7. The method of claim 6, wherein the fibers are fabricated in a pattern.

8. The method of claim 7, wherein the pattern comprises:
    a uniform pattern.

9. The method of claim 7, wherein the pattern comprises:
    a staggered pattern.

10. The method of claim 7, wherein the pattern comprises:
    a random pattern.

11. An object containing a fiber created by the method of claim 1.

12. The method of claim 1, further comprising:
    extruding an additional amount of material as the extruder head moves away from the object.

13. A method of fabricating an object containing fibers in a single process using a 3D printer having an extrusion head comprising:
    forming an object using the 3D printer;
    extruding an amount of material in liquid form from the extrusion head onto the object;
    drawing a thin fiber by moving the extrusion head away from the object,
        wherein a portion of the material remains attached to the extruder head as the extrusion head moves away from the object,
        wherein the fiber thins as the extrusion head moves away from the object;
    maintaining tension on the portion of the material between the object and the extrusion head until it cools into solid form, thereby forming the thin fiber having a first end attached to the object and a second end attached to the extruder head; and
    terminating the fiber to create a free end at the second end of the fiber by detaching the fiber from the extruder head.

* * * * *